US012632447B1

(12) United States Patent    (10) Patent No.:   US 12,632,447 B1
Samad et al.      (45) Date of Patent:     May 19, 2026

(54) SYSTEMS AND METHODS FOR AUTOMATICALLY ENSURING DATA QUALITY USING LLMs

(71) Applicant: INTUIT INC., Mountain View, CA (US)

(72) Inventors: Sona Samad, Bangalore (IN); Kalapriya Kannan, Bangalore (IN); Chandarasekaran Myilsamy, Bangalore (IN); Akash Rai, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/261,989

(22) Filed: Jul. 7, 2025

(51) Int. Cl.
     *G06F 16/242*      (2019.01)
     *G06F 16/21*      (2019.01)
     *G06F 16/25*      (2019.01)

(52) U.S. Cl.
     CPC .......... *G06F 16/243* (2019.01); *G06F 16/211* (2019.01); *G06F 16/254* (2019.01)

(58) Field of Classification Search
     CPC ..... G06F 16/243; G06F 16/211; G06F 16/254
     See application file for complete search history.

(56) References Cited

U.S. PATENT DOCUMENTS

| | | | |
|---|---|---|---|
| 2019/0079978 A1* | 3/2019 | Ali | G06F 16/243 |
| 2023/0098227 A1* | 3/2023 | Nadeau | G06F 16/2379 |
| | | | 707/602 |
| 2024/0193174 A1* | 6/2024 | Manzano | G06F 16/254 |
| 2025/0225429 A1* | 7/2025 | Young | G06N 20/00 |

OTHER PUBLICATIONS

Ramesh, Dynamic Data Quality Rule Generation using LLM in Databricks, 2025, website (Year: 2015).*

* cited by examiner

*Primary Examiner* — Sonia L Gay
(74) *Attorney, Agent, or Firm* — DLA PIPER LLP US

(57) ABSTRACT

A system and method are provided for automatically ensuring data quality using LLMs.

18 Claims, 12 Drawing Sheets

100

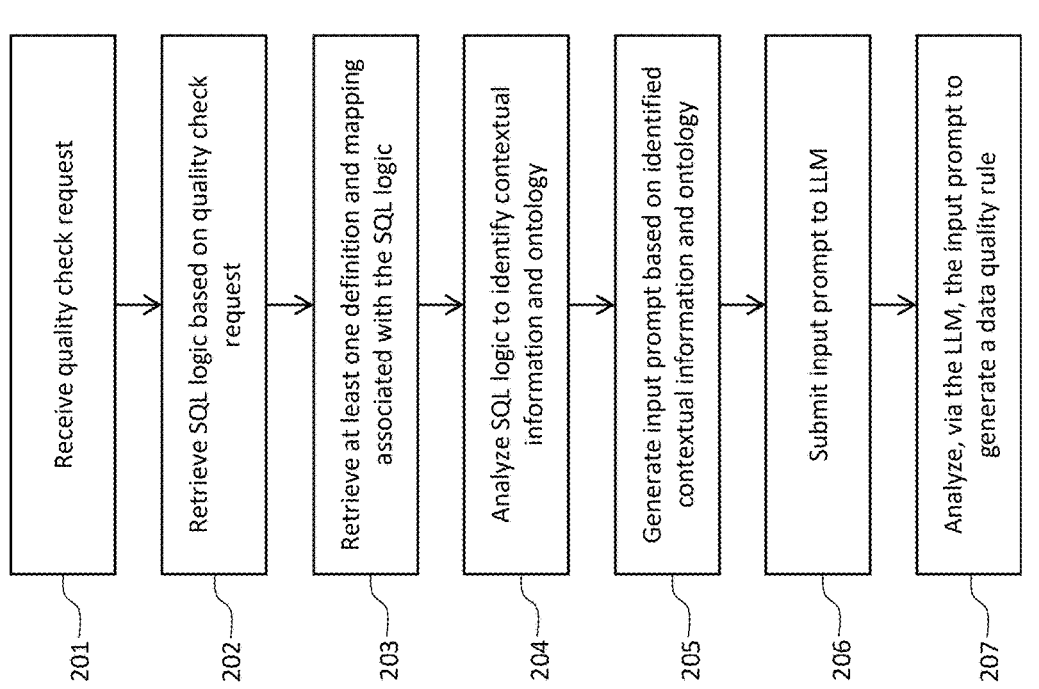

200

201 — Receive quality check request

202 — Retrieve SQL logic based on quality check request

203 — Retrieve at least one definition and mapping associated with the SQL logic 204 — Analyze SQL logic to identify contextual information and ontology 205 — Generate input prompt based on identified contextual information and ontology 206 — Submit input prompt to LLM 207 — Analyze, via the LLM, the input prompt to generate a data quality rule

```
unset
insert overwrite table dbill_product
select
    pt.paid_id0,fs.name
    from ued_obrm_dwh.plan_t pt
    inner join ued_webs_dwh.offer_component  oc on oc.offer_id = pt.name
    inner join ued_webs_dwh.package_component pc on
pc.package_id = oc.package_id
    inner join ued_webs_dwh.feature_set fs on fs.feature_set_id
= pc.feature_set_id;
insert overwrite table intu_orders
select account_obj_id0
    ,opcode_name
    ,bill_obj_id0
    ,CASE WHEN iot.package_id = 0 THEN iop.package_id
ELSE iot.package_id END PACKAGE_ID
    ,payment_trans_id
    ,created_t
    from ued_obrm_dwh.intu_order_t iot
    left join ued_obrm_dwh.intu_order_packages_t iop on
iot.poid_id0 = iop.obj_id0;
insert into sbseg_dm.sbseg_company_gns
with cancel_events as <>>>
```

SYSTEMS AND METHODS FOR AUTOMATICALLY ENSURING DATA QUALITY USING LLMs

BACKGROUND OF THE DISCLOSURE

Extract, transform, and load (ETL) is a common integration process that organizations use to combine data from multiple systems in a single place, such as a database, data store, data warehouse, data lake, etc. ETL logic generally is configured to perform various business transformations and aggregation on source data to generate reporting attributes. This then can assist with business intelligence, data analytics, machine learning, and various other downstream processes. In addition, the quality of this data is important for accuracy, performance, and reporting purposes.

However, current ETL logic does not itself contain data quality rules, and there is significant human effort involved in deriving such rules to ensure data quality. For example, manually generated data quality checks can be used to measure the quality of data reported from the derived attributes. But such manually generated checks are undesirable because it requires time, which reduces the changes of proactively identifying data quality issues, leading to potential data incidents.

BRIEF DESCRIPTION OF THE FIGURES

FIG. 2 is an example process for automatically ensuring data quality using large language models (LLMs) according to example embodiments of the present disclosure.

FIG. 6 shows an example SQL logic according to example embodiments of the present disclosure.

FIG. 7 shows example column usage according to example embodiments of the present disclosure.

FIG. 8 shows an example data definition according to example embodiments of the present disclosure.

FIG. 9 shows an example ontology according to example embodiments of the present disclosure.

The drawings are not necessarily to scale, or inclusive of all elements of a system, emphasis instead generally being placed upon illustrating the concepts, structures, and techniques sought to be protected herein.

DESCRIPTION

The following detailed description is merely exemplary in nature and is not intended to limit the claimed invention or the applications of its use.

Embodiments of the disclosure are directed to system and methods for automatically ensuring data quality using LLMs. The disclosed techniques can leverage the capabilities of LLMs to automatically derive data quality rules for structured query language (SQL)-based ETL pipelines. For a specific request, various contextual information can be provided as an input prompt to an LLM, such as the SQL logic to derive the target data, data definitions for the tables and attributes participating in the derivation, and entity relationships between all the tables involved in the join conditions, and existing data quality checks (if any) to provide few shot learning examples. The LLM can then analyze the input prompt to infer and generate data quality rules, such as formal, executable data quality rules or descriptive data quality "prompts" across multiple quality dimensions. The generated rules can then be automatically evaluated to ensure syntactical accuracy and effectiveness, implemented into a distributed version control repository, such as a Git repository, and used to ensure data quality for future tasks. As described in detail below, automating data quality assurance requires specific technical solutions to technical problems having no equivalent in the previously-used manual processes.

Figure 1:
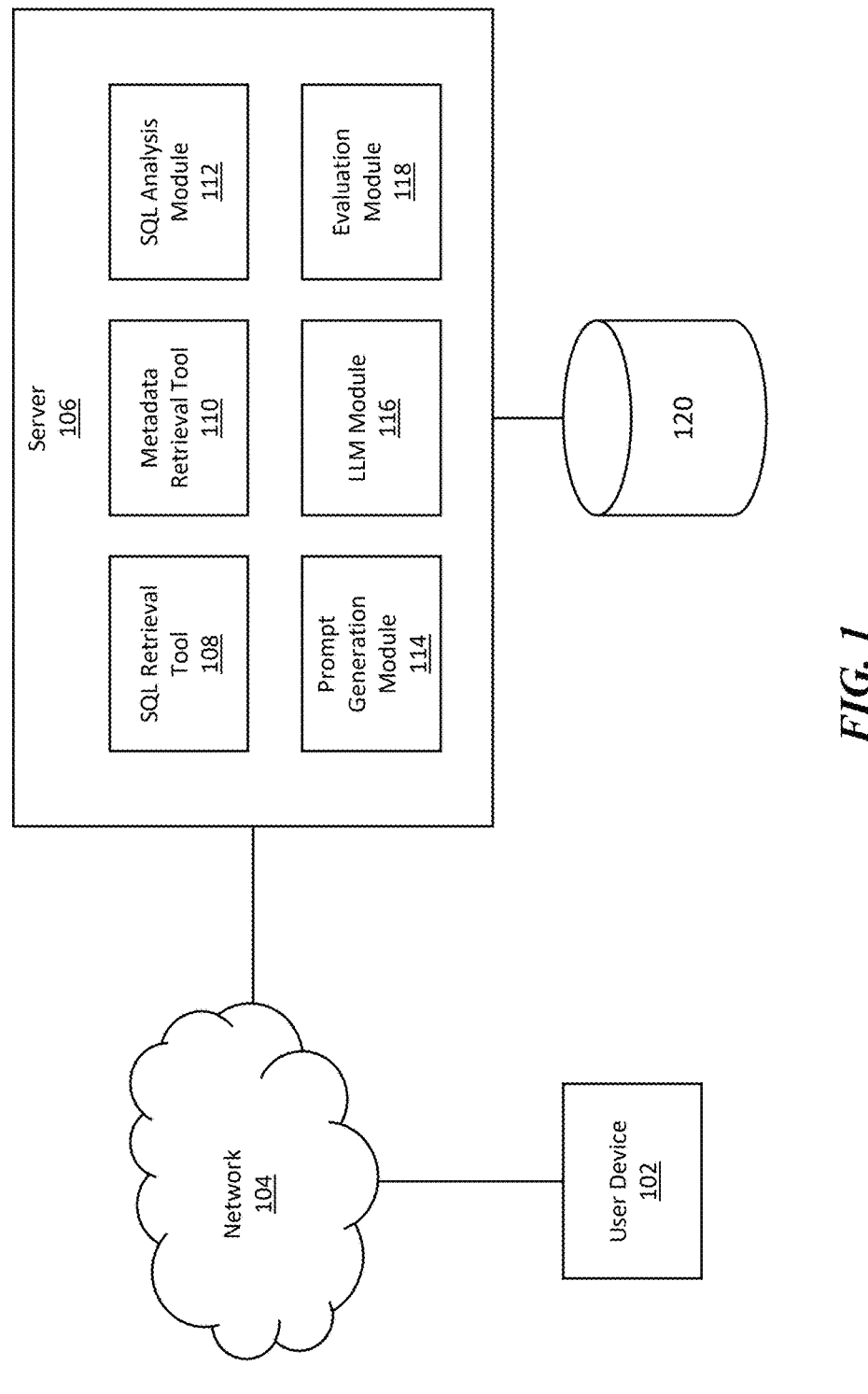
FIG. 1 is a block diagram of an example system for automatically ensuring data quality using LLMs according to example embodiments of the present disclosure.

FIG. 1 is a block diagram of an example system 100 for automatically ensuring data quality using LLMs according to example embodiments of the present disclosure. The system 100 can include one or more user devices 102 (generally referred to herein as a "user device 102" or collectively referred to herein as "user devices 102") that can access a server 106 via a network 104 to facilitate communication and engagement with an ETL pipeline, such as an SQL-based ETL pipeline. In some embodiments, the system 100 can allow a user to perform various tasks within the ETL pipeline, such as generating and executing SQL queries. In some embodiments, the system 100 can include any number of user devices 102. For example, for a financial or accounting platform or other website that may offer services to users, there may be an extensive userbase with thousands or even millions of users that connect to the system 100 via their user devices 102. In some embodiments, the user can be any downstream consumer who can access the automated data quality generation system (i.e., system 100) using an application programming interface (API) request. In some embodiments, the user can communicate using an API gateway with a defined contract and authorization to access the ETL pipeline.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, or other suitable device. In some embodiments, a user device 102 can be the same as or similar to the computing device 1100 described below with respect to FIG. 11.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 1000 described below with respect to FIG. 10.

As shown in FIG. 1, the server 106 can include an SQL retrieval tool 108, an metadata retrieval tool 110, an SQL analysis module 112, a prompt generation module 114, an LLM module 116, and an evaluation module 118.

In some embodiments, the SQL retrieval tool 108 can receive a request from the user device 102 to generate a quality check (i.e., a "quality check request"). In some embodiments, the SQL retrieval tool 108 can include an orchestration service that triggers the automated data quality generation techniques based on receiving the quality check request from the user device 102. In some embodiments, the quality check request can include a user-defined transformation pipeline and/or table details for which the user would like to generate the quality checks. In some embodiments, the API contract can receive the user-defined transformation pipeline and/or table details as input parameters and respond with an offline job ID for tracking purposes. In addition, a unique request ID for the incoming request can be created and bundled together for subsequent processing.

Figure 7:
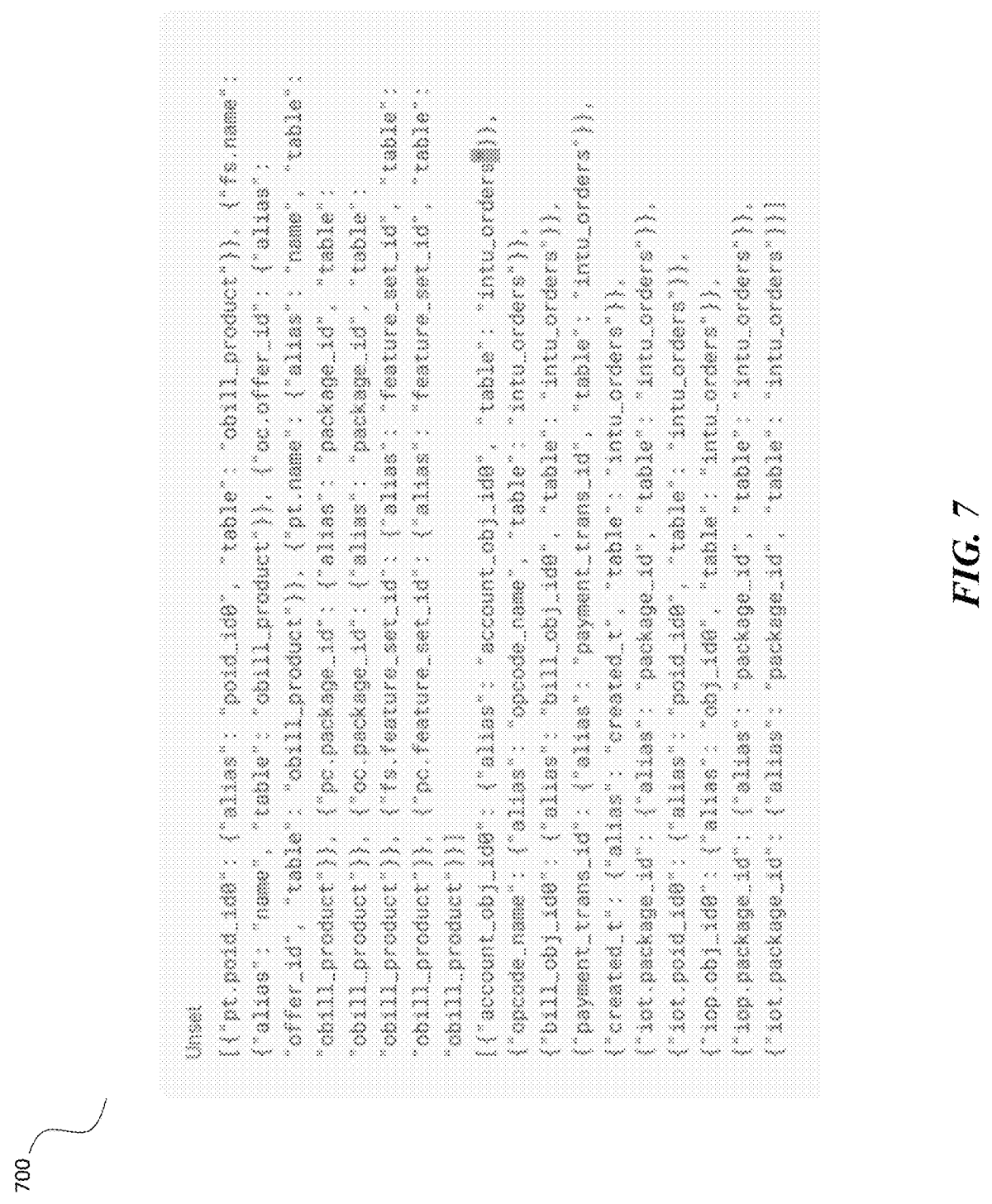

In addition, the SQL retrieval tool 108 can access a distributed version control repository 120 to retrieve existing SQL logic based on the received quality check request. In the examples described herein, a Git repository is used as the distributed version control repository 120. In some embodiments, the SQL retrieval tool 108 can utilize a GitHub API to trigger access to the repository 120 and persist the SQL logic for the request along with the request ID. In some embodiments, the SQL retrieval tool 108 can be configured to parse the SQL query to identify intermediate transformation steps. For example, the SQL retrieval tool 108 can utilize an SQL logic parser to identify said transformation steps. In some embodiments, the SQL retrieval tool 108 can be configured to parse the SQL query to identify source and target tables. For example, the SQL retrieval tool 108 can parse the existing codebase (e.g., within the Git repository) to extract source and target table names and persist the table and column details along with the request ID (example column details and usage is shown in FIG. 7).

In some embodiments, the metadata retrieval tool 110 can be configured to retrieve attribute definitions and mappings associated with the received quality check request. In some embodiments, the metadata retrieval tool 110 can retrieve details of tables and columns identified via the SQL retrieval tool 108. In some embodiments, the metadata retrieval tool 110 can use the metadata API to trigger access to the data definitions and table/column mappings for the incoming request details. In some embodiments, the metadata retrieval tool 110 can persist the data definitions and mappings along with the request ID and publish a processing success message to an associated message queue.

In some embodiments, the SQL analysis module 112 can be configured to analyze the retrieved SQL logic to identify contextual information and ontology related to the SQL logic. For example, the SQL analysis module 112 can generate a set of information that can be used as an input prompt for the LLM module 116 to generate the data quality rule. In some embodiments, the SQL analysis module 112 can obtain the following information by analyzing the SQL logic: 1) database table schema and column mapping, which provides a mapping of aliases to actual column names and their corresponding tables and highlights the columns used from different tables and how they are referenced with potentially simplified names; 2) SQL processing logic, which can contain SQL queries that define how data is extracted, transformed, and loaded into the target table; 3) data field definitions, which can provide descriptions for the fields in the target table; 4) data quality checks cheat list, which can provide a general overview of important data quality checks; 5) existing checks (if any) from the manual data validation queries created, which can provide specific SQL queries that are used as data quality checks for the target table, that were created manually; and 6) a data pipeline ontology, which can provide a semantic layer representation of the entities, attributes, and relationships involved in the SQL query that loads the target table.

In some embodiments, the SQL analysis module 112 can identify column usages for source and target tables and utilize existing solutions to map column usage in both source and target tables. In some embodiments, the SQL analysis module 112 can identify column lineages of target attributes to source attributes, such as by determining the shortest path of lineage from target attributes back to source attributes. In some embodiments, the SQL analysis module 112 can identify the derivation of logic of target attributes from source attributes by analyzing the logic that derives the target attributes from the source attributes.

In some embodiments, the SQL analysis module 112 can further be configured to perform various deep semantic analysis techniques, such as by extracting data quality-relevant semantics. In general, SQL analysis module 112 can integrate the parsed SQL semantics with multiple external context sources (e.g., business logic and/or business transformations) to resolve ambiguity in SQL logic. The SQL parsing libraries can be used to derive/represent an attribute relationship derived from actual business logic. In some embodiments, representing a semantic relationship between multiple data entities can be performed by utilizing Resource Description Framework (RDF) libraries on the attribute relationship derived from actual business logic, such as by using knowledge graphs, ontologies built from business context, etc. In some embodiments, the SQL analysis module 112 can integrate processing logic involved in understanding sequences in ETL, such as data flow constraints. In addition, the SQL analysis module 112 can utilize an integration algorithm that weighs and combines evidence from SQL semantics (e.g., JOIN keys, WHERE clauses, transformations, etc.) and the contextual sources (e.g., schema, business logic relationships, entity semantics, etc.) to make a more reliable inference about a data quality constraint.

In some embodiments, the SQL analysis module 112 can utilize various algorithms and techniques to infer user intent related to data constraints and business validation rules from the structure and semantics of SQL transformations and filters, leveraging the understanding derived above with respect to context sources.

In some embodiments, the prompt generation module 114 can be configured to generate an input prompt to be fed to the LLM module 116. As discussed above, the input prompt can include various information extracted and identified by the SQL analysis module 112, such as 1) database table schema and column mapping, which can provide a mapping of aliases to actual column names and their corresponding tables and highlights the columns used from different tables and how they are referenced with potentially simplified names; 2) SQL processing logic, which can contain SQL queries that define how data is extracted, transformed, and loaded into the target table; 3) data field definitions, which can provide descriptions for the fields in the target table; 4) data quality checks cheat list, which can provide a general overview of important data quality checks; 5) existing checks (if any) from the manual data validation queries created, which can provide specific SQL queries that are used as data quality checks for the target table, that were created manually; and 6) a data pipeline ontology, which can provide a semantic layer representation of the entities, attributes, and relationships involved in the SQL query that loads the target table.

In some embodiments, the LLM module 116 can include various types of LLMs, such as GPT-3, -3.5, -4, PaLM-E, Ernie Bot, LLaMa, and others, and the various modules and engines contained therein can be configured to utilize the LLM to perform various tasks. In some embodiments, the LLM can include various transformer-based models trained on vast corpuses of data that utilize an underlying neural network. In some embodiments, the LLM module 116 can be configured to generate a data quality rule based on analyzing the received input prompt. Example data quality rules can include, but are not limited to, uniqueness rules, referential integrity rules, value constraint rules, pattern rules, and completeness rules. The rules can be applicable to the data sources and targets involved, which is contrasted with traditional techniques that are limited to performance, lineage, and syntactical rules. In some embodiments, the generated data quality rule can be a formal, executable rule or a descriptive data quality prompt across multiple quality dimensions (e.g., type/format/logic, completeness, constraint/range). In some embodiments, the LLM module 116 can generate specific templates, rule domain specific language (DSL) generation (e.g., regular expression, domain specific objects, SQL, etc.), and/or confidence scoring based on the strength of an inference. In some embodiments, the usable format of the rule can be for Great Expectations, Deequ, and/or a custom framework.

In some embodiments, the evaluation module 118 can be configured to evaluate the data quality rule(s) generated by the LLM module 116. For example, the evaluation module 118 can verify the SQL query, such as for syntax errors. In addition, the evaluation module 118 can be configured to obtain sample data for evaluation using a data sampler and actual transformation logic. In some embodiments, the evaluation module 118 can perform a distributed processing-based data validation test (e.g., Pyspark) using the generated rule. In some embodiments, the evaluation module 118 can transmit the evaluation results to the prompt generation module 114 for feedback that can be used to optimize the SQL query.

In some embodiments, once the generated data quality rule has had its evaluation completed, it can be output and pushed to the Git repository 120 for use in ensuring data quality checks for future tasks.

FIG. 2 is an example process 200 for automatically ensuring data quality using LLMs according to example embodiments of the present disclosure. In some embodiments, the process 200 can be performed within the system 100 of FIG. 1 by the server 106 and its various modules.

Figure 8:
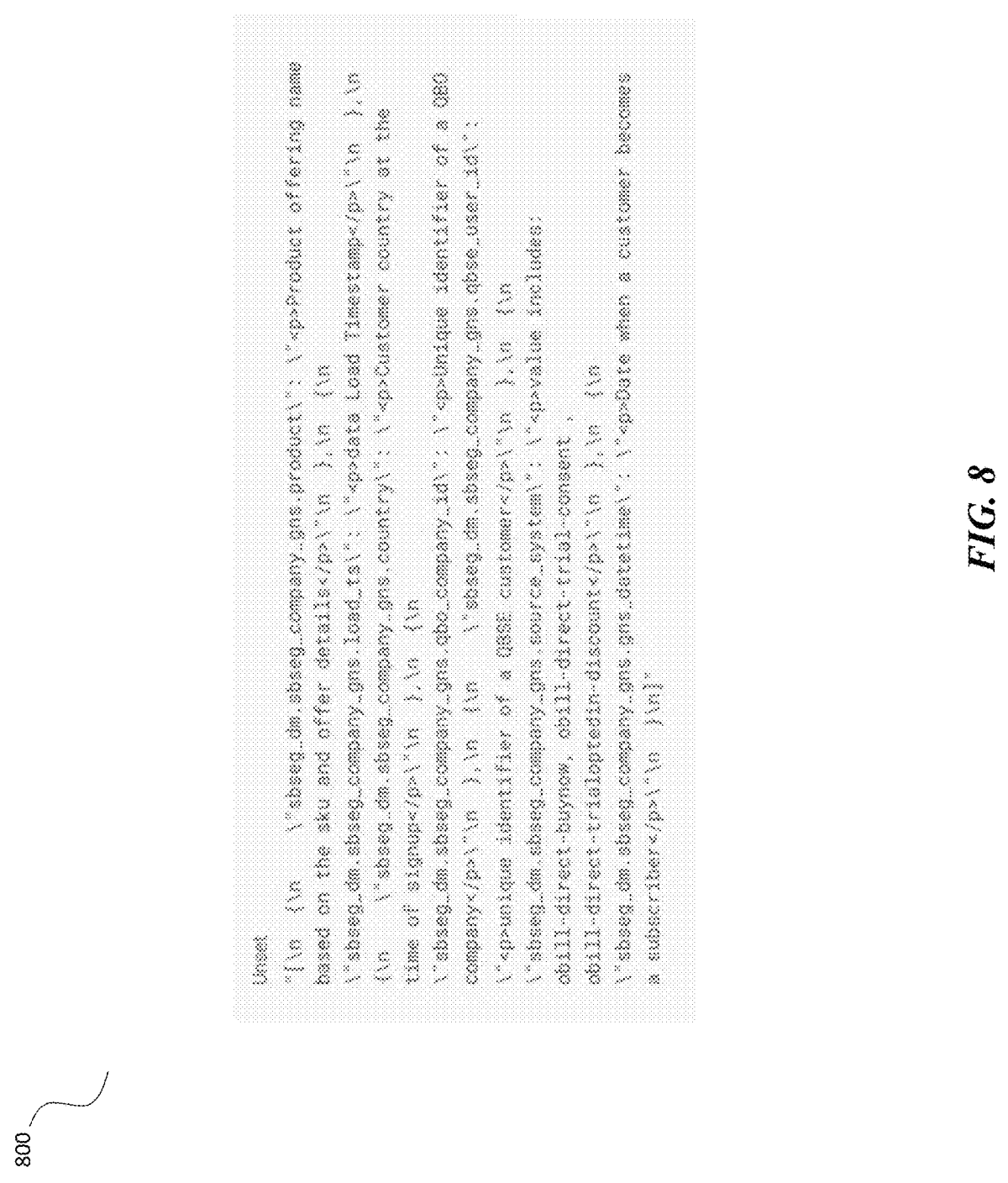

At block 201, the process 200 can include receiving, via the SQL retrieval tool 108, a quality check request from a user device 102. In some embodiments, the quality check request can include a user-defined transformation pipeline and/or table details for which the user would like to generate the quality checks. At block 202, the process 200 can include retrieving, via the SQL retrieval tool 108, SQL logic based on the quality check request. An exemplary SQL logic is shown in FIG. 6. For example, the SQL retrieval tool 108 can access the Git repository 120 to retrieve the relevant SQL logic. In some embodiments, retrieving the SQL logic can include parsing the SQL query/logic to identify one or more intermediate transformation steps. In some embodiments, retrieving the SQL logic can include parsing the SQL query/logic to identify one or more source and target tables. At block 203, the process 200 can include, via the metadata retrieval tool 110, retrieving at least one definition (i.e., data definitions and/or attribute definitions) and mapping associated with the SQL logic (an example data definition is shown in FIG. 8). In some embodiments, the metadata retrieval tool 110 can retrieve details of tables and columns identified via the SQL retrieval tool 108 (exemplary column details and usage information is shown in FIG. 7).

At block 204, the process 200 can include analyzing the SQL logic to identify contextual information and an associated ontology (an example ontology is shown in FIG. 9). In some embodiments, analyzing the SQL logic can include generating a set of information that can be used as an input prompt for the LLM module 116. In some embodiments, the SQL analysis module 112 can obtain the following information by analyzing the SQL logic: 1) database table schema and column mapping, which can provide a mapping of aliases to actual column names and their corresponding tables and highlights the columns used from different tables and how they are referenced with potentially simplified names; 2) SQL processing logic, which can contain SQL queries that define how data is extracted, transformed, and loaded into the target table; 3) data field definitions, which can provide descriptions for the fields in the target table; 4) data quality checks cheat list, which can provide a general overview of important data quality checks; 5) existing checks (if any) from the manual data validation queries created, which can provide specific SQL queries that are used as data quality checks for the target table, that were created manually; and 6) a data pipeline ontology, which can provide a semantic layer representation of the entities, attributes, and relationships involved in the SQL query that loads the target table.

In some embodiments, analyzing the SQL logic can include identifying column usages for source and target tables and utilize existing solutions to map column usage in both source and target tables. In some embodiments, the SQL analysis module 112 can identify column lineages of target attributes to source attributes, such as by determining the shortest path of lineage from target attributes back to source attributes. In some embodiments, the SQL analysis module 112 can identify the derivation of logic of target attributes from source attributes by analyzing the logic that derives the target attributes from the source attributes.

In some embodiments, analyzing the SQL logic can include performing one or more deep semantic analyzing techniques to extract data quality-relevant semantics and understand the SQL logic. For example, the SQL analysis module 112 can integrate the parsed SQL semantics with multiple external context sources (e.g., business logic and/or business transformations) to resolve ambiguity in SQL logic. The SQL parsing libraries can be used to derive/represent an attribute relationship derived from actual business logic. In some embodiments, representing a semantic relationship between multiple data entities can be performed by utilizing Resource Description Framework (RDF) libraries on the attribute relationship derived from actual business logic, such as by using knowledge graphs, ontologies built from business context, etc. In some embodiments, the SQL analysis module 112 can integrate processing logic involved in understanding sequences in ETL, such as data flow constraints. In addition, the SQL analysis module 112 can utilize an integration algorithm that weighs and combines evidence from SQL semantics (e.g., JOIN keys, WHERE clauses, transformations, etc.) and the contextual sources (e.g., schema, business logic relationships, entity semantics, etc.) to make a more reliable inference about a data quality constraint.

In some embodiments, analyzing the SQL logic can include applying one or more algorithms and techniques to help infer user intent related to data constraints and business validation rules from the structure and semantics of SQL transformations and filters.

At block 205, the process 200 can include generating, via the prompt generation module 114, an input prompt based on the identified contextual information and ontology. In some embodiments, generating the input prompt can include compiling various information as obtained/identified by the SQL analysis module 112, such as 1) database table schema and column mapping, which can provide a mapping of aliases to actual column names and their corresponding tables and highlights the columns used from different tables and how they are referenced with potentially simplified names; 2) SQL processing logic, which can contain SQL queries that define how data is extracted, transformed, and loaded into the target table; 3) data field definitions, which can provide descriptions for the fields in the target table; 4) data quality checks cheat list, which can provide a general overview of important data quality checks; 5) existing checks (if any) from the manual data validation queries created, which can provide specific SQL queries that are used as data quality checks for the target table, that were created manually; and 6) a data pipeline ontology, which can provide a semantic layer representation of the entities, attributes, and relationships involved in the SQL query that loads the target table. In addition, the prompt can include the originally retrieved SQL logic.

At block 206, the process 200 can include submitting the input prompt to the LLM module 116. At block 207, the process 200 can include analyzing, via the LLM module 116, the input prompt to generate a data quality rule. In some embodiments, the data quality rule can include, but is not limited to, a uniqueness rule, a referential integrity rule, a value constraint rule, a pattern rule, and a completeness rule. The rule can be applicable to the data sources and targets involved, which is contrasted with traditional techniques that are limited to performance, lineage, and syntactical rules. In some embodiments, the generated data quality rule can be a formal, executable rule or a descriptive data quality prompt across multiple quality dimensions (e.g., type/format/logic, completeness, constraint/range). In some embodiments, the LLM module 116 can generate specific templates, rule DSL generation, and/or confidence scoring based on the strength of an inference. In some embodiments, the usable format of the rule can be for Great Expectations, Deequ, and/or a custom framework.

In some embodiments, the process 200 can include various additional steps. For example, in some embodiments, the process 200 can include evaluating, via the evaluation module 118, the data quality rule(s) generated by the LLM module 116. For example, the evaluation module 118 can verify the SQL query, such as for syntax errors. In addition, the evaluation module 118 can be configured to obtain sample data for evaluation using a data sampler and actual transformation logic. In some embodiments, the evaluation module 118 can perform a distributed processing-based data validation test using the generated rule.

Once the rule has been evaluated to a desirable extent, the rule can be output into the Git repository 120 for use in evaluating the quality of data and SQL queries elsewhere in the ETL pipeline. In some embodiments, the rules can be created by a SQL-based DSL and pushed to the Glt repository. In some embodiments, various processes that can run these SQL-based configurations on the data to be analyzed to perform actual data quality checks.

In addition, in some embodiments, the process 200 can include a re-training or optimization step. For example, the evaluation module 118 can transmit the evaluation results to the prompt generation module 114 for feedback that can be used to optimize the SQL query. This can be used to re-train, fine-tune, or otherwise update the LLM module 116 for generating an improved data quality rule.

Figure 3A:
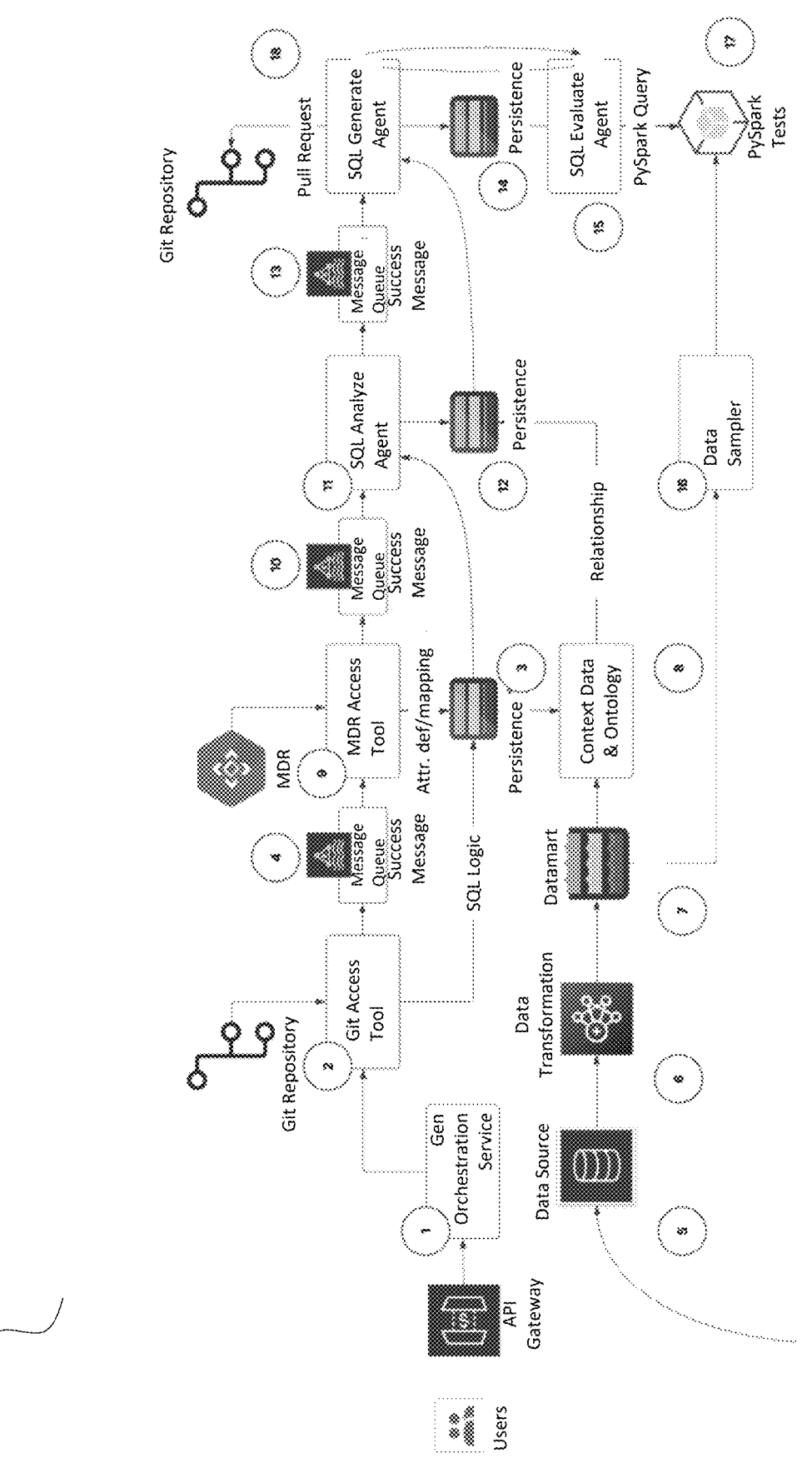
FIGS. 3A-3B show a high level flow for automatically ensuring data quality using LLMs according to example embodiments of the present disclosure.
Figure 3B:
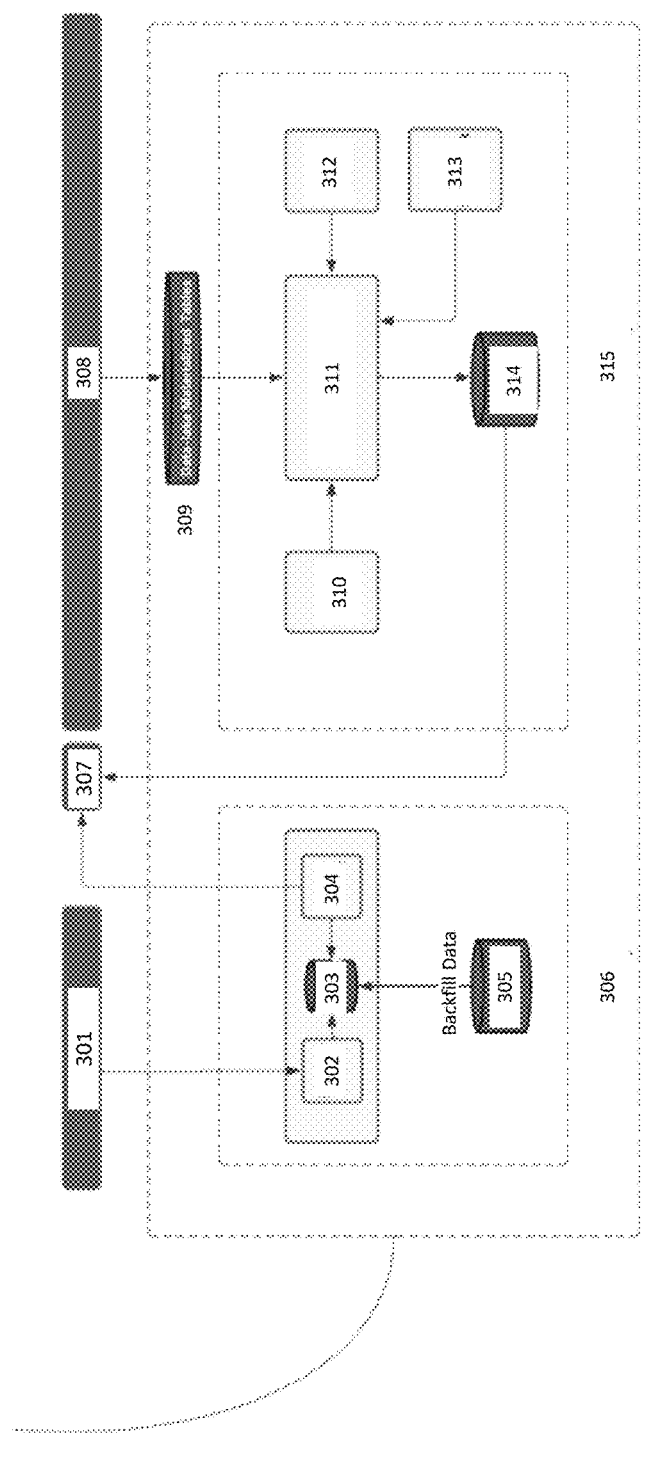

FIGS. 3A-3B show a high level flow 300 for automatically ensuring data quality using LLMs according to example embodiments of the present disclosure. At (1), the SQL retrieval tool 108 can, e.g., via an API gateway, receive a data quality check request from a user (e.g., via user device 102). At (2), the SQL retrieval tool 108 can access a Git repository (e.g., Git repository 120) to retrieve SQL logic associated with the quality check request.

At (3), the retrieved SQL logic can be persisted so that the SQL analysis module 112 (11) can identify contextual information and an ontology associated with the SQL logic. For example, the SQL analysis module 112 can access a data source (5), a data transformation job (6), and/or a datamart (7). As shown in FIG. 3B, the data source (5) is communicably coupled to various processing modules 306 and 315. In some embodiments, the real time processing module 306 can include an ingestion service 302 that receives domain events 301. In addition, the processing module 306 can include a cloud data warehouse service 303 that receives events from the ingestion service 302, backfill data from one or more materialized tables 305, and queries from a query service 304. In some embodiments, the query service 304 can provide queries to a data cloud 307, which can also receive information from a customer profile data store 314.

In addition, a batch processing pipeline 311 can receive information from a batch processing scheduler 310, data quality checks 312, a quick ETL framework library 313, and various data lake materialized tables 309 that are received from a data ingestion process 308.

At (4), the SQL logic is provided to a message queue and received by the metadata retrieval tool 110 so that, at (9), the metadata retrieval tool 110 can retrieve at least one definition and mapping associated with the SQL logic from the metadata repository. At (10), the at least one definition and mapping associated with the SQL logic can be placed into a message queue so that the SQL analysis module 112 can analyze the information at (11). At (12), the identified contextual information is persisted in a persistence layer.

At (13), the information identified by the SQL analysis module 112 can be placed into a message queue. At (18), the LLM module 116 can analyze the prompted input, consistent with the embodiments discussed herein, to generate a data quality rule. At (14), the generated data quality rule can be persisted in a persistence layer so that an evaluation module 118, at (15), can evaluate the generated data quality rule. For example, at (17), a distributed processing test can be run on the data quality rule, in accordance with a data sampler (16) that receives data from a datamart (7). Once the data quality rule has been generated and evaluated, it can be output to the Git repository 120.

Figure 4:
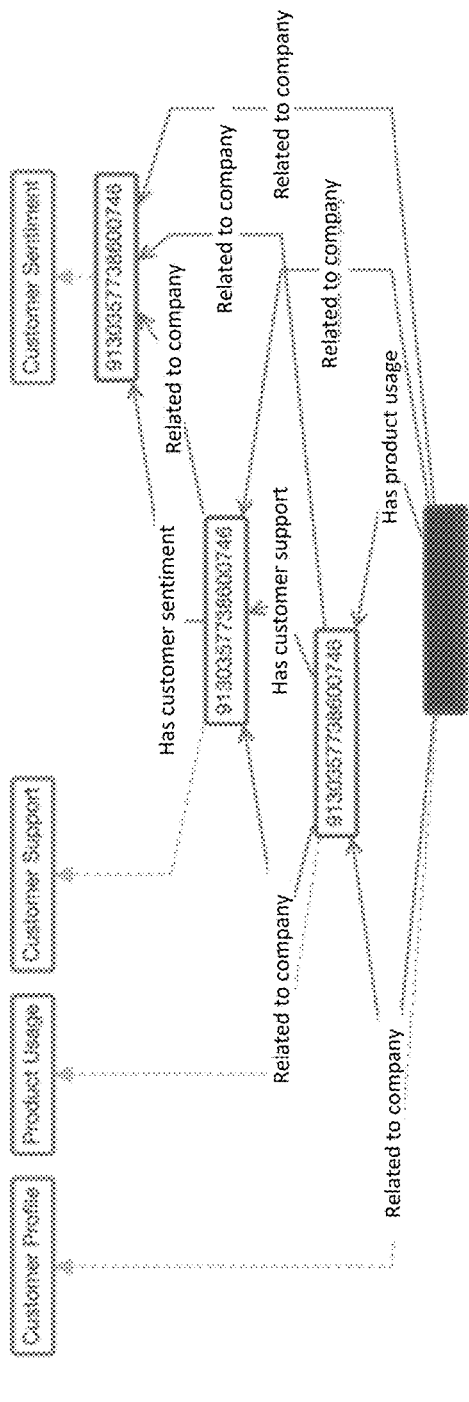
FIG. 4 shows an example semantic layer representation according to example embodiments of the present disclosure.

FIG. 4 shows an example semantic layer representation according to example embodiments of the present disclosure. In some embodiments, the semantic layer can represent the relationships between each domain specific object extracted. For example, it can be used to identify one customer and how different domain objects like profile, product usage, sentiments etc. are related to the customer.

Figure 5:
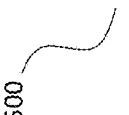
FIG. 5 shows an example data pipeline according to example embodiments of the present disclosure.

FIG. 5 shows an example data pipeline 500 according to example embodiments of the present disclosure. The pipeline 500 can include a developer and an orchestrator. The pipeline can include a Git repository 501, where SQL logic is obtained at 502 via a Git code access. At 503, the obtained SQL logic is analyzed so that it can be placed into an analytics ETL 504. If the SQL logic is an analytics ETL, then it can be processed by a DocUtil parser 505, a configuration parser 506, and an SQL parser 507. If the SQL logic is not a quick ETL, then it can be processed by the SQL parser 507. At 508, the SQL logic can undergo human evaluation.

At 509, transformation logic can be generated and, at 510, a source target mapping can be generated in accordance with a metadata API. At 511, a persistence layer can be used to persist logic and mappings. Moreover, the feedback from the human evaluation at 508 can be provided to a persistence layer 512 that includes one or more SQL blocks. At 513, the SQL analysis module 112 can generate a data quality rule in conjunction with the embodiments and techniques described herein. At 514, the generated data quality rule can be manually reviewed and, at 515, the data quality rule can be evaluated via the evaluation module 118.

In some embodiments, at 516, other data quality checks can be performed. Those checks can similarly be analyzed by the evaluation module 118 at 519 and/or be evaluated manually at 517. The data quality rule can then be output to the Git repository 520.

Figure 10:
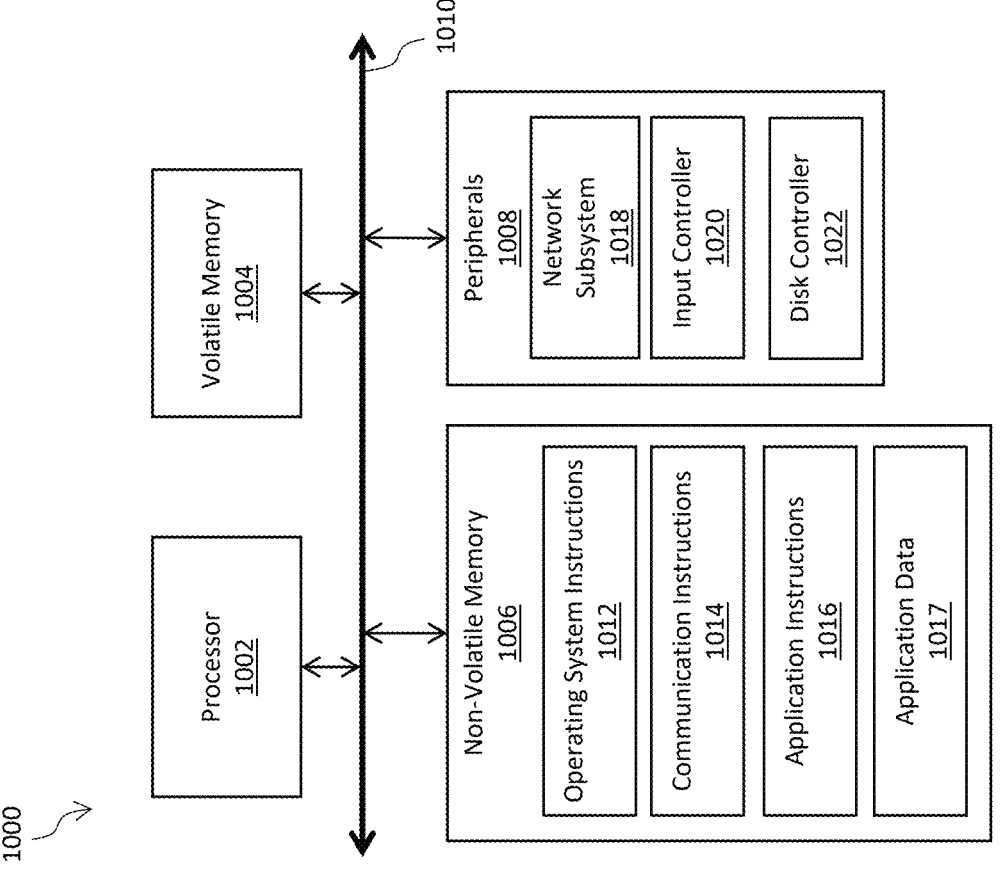
FIG. 10 is a diagram of an example computing device or server device.

FIG. 10 is a diagram of an example computing device or server device. Server 1000 can implement various features and processes as described herein. Server 1000 can be implemented on any electronic device that runs software applications derived from complied instructions, including without limitation personal computers, servers, smart phones, media players, electronic tablets, game consoles, email devices, etc. In some implementations, server 1000 can include one or more processors 1002, volatile memory 1004, non-volatile memory 1006, and one or more peripherals 1008. These components can be interconnected by one or more computer buses 1010.

Processor(s) 1002 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 1010 can be any known internal or external bus technology, including but not limited to ISA, EISA, PCI, PCI Express, USB, Serial ATA, or FireWire. Volatile memory 1004 can include, for example, SDRAM. Processor 1002 can receive instructions and data from a read-only memory or a random access memory or both. Essential elements of a computer can include a processor for executing instructions and one or more memories for storing instructions and data.

Non-volatile memory 1006 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 1006 can store various computer instructions including operating system instructions 1012, communication instructions 1014, application instructions 1016, and application data 1017. Operating system instructions 1012 can include instructions for implementing an operating system (e.g., Mac OS®, Windows®, or Linux). The operating system can be multi-user, multiprocessing, multitasking, multithreading, real-time, and the like. Communication instructions 1014 can include network communications instructions, for example, software for implementing communication protocols, such as TCP/IP, HTTP, Ethernet, telephony, etc. Application instructions 1016 can include instructions for various applications. Application data 1017 can include data corresponding to the applications.

Peripherals 1008 can be included within server device 1000 or operatively coupled to communicate with server device 1000. Peripherals 1008 can include, for example, network subsystem 1018, input controller 1020, and disk controller 1022. Network subsystem 1018 can include, for example, an Ethernet of WiFi adapter. Input controller 1020 can be any known input device technology, including but not limited to a keyboard (including a virtual keyboard), mouse, track ball, and touch-sensitive pad or display. Disk controller 1022 can include one or more mass storage devices for storing data files; such devices include magnetic disks, such as internal hard disks and removable disks; magneto-optical disks; and optical disks.

Figure 11:
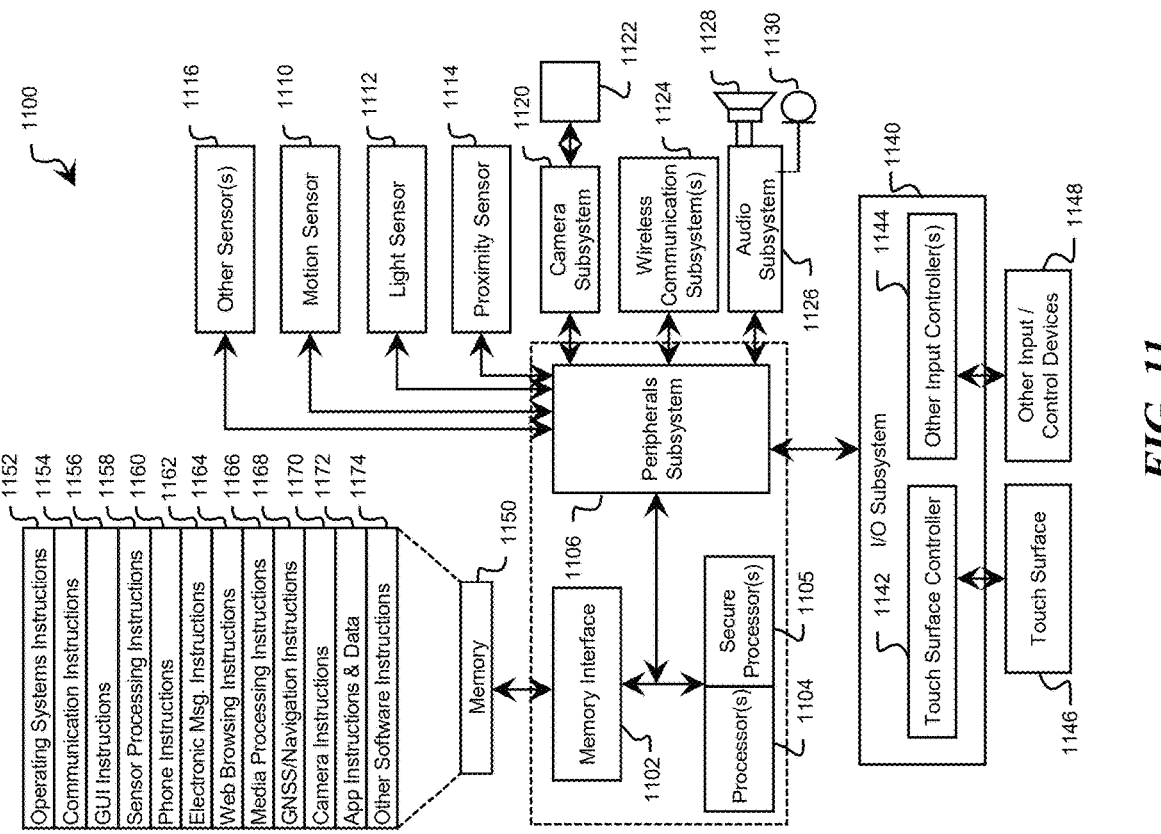
FIG. 11 is another example of a computing device.

FIG. 11 is another example of a computing device. The illustrative user device 1100 can include a memory interface 1102, one or more data processors, image processors, central processing units 1104, and or secure processing units 1105, and peripherals subsystem 1106. Memory interface 1102, one or more central processing units 1104 and or secure processing units 1105, and or peripherals subsystem 1106 can be separate components or can be integrated in one or more integrated circuits. The various components in user device 1100 can be coupled by one or more communication buses or signal lines.

Sensors, devices, and subsystems can be coupled to peripherals subsystem 1106 to facilitate multiple functionalities. For example, motion sensor 1110, light sensor 1112, and proximity sensor 1114 can be coupled to peripherals subsystem 1106 to facilitate orientation, lighting, and proximity functions. Other sensors 1116 can also be connected to peripherals subsystem 1106, such as a global navigation satellite system (GNSS) (e.g., GPS receiver), a temperature sensor, a biometric sensor, magnetometer, or other sensing device, to facilitate related functionalities.

Camera subsystem 1120 and optical sensor 1122, e.g., a charged coupled device (CCD) or a complementary metal-oxide semiconductor (CMOS) optical sensor, can be utilized to facilitate camera functions, such as recording photographs and video clips. Camera subsystem 1120 and optical sensor 1122 can be used to collect images of a user to be used during authentication of a user, e.g., by performing facial recognition analysis.

Communication functions can be facilitated through one or more wired and or wireless communication subsystems 1124, which can include radio frequency receivers and transmitters and or optical (e.g., infrared) receivers and transmitters. For example, the Bluetooth (e.g., Bluetooth low energy (BTLE)) and or WiFi communications described herein can be handled by wireless communication subsystems 1124. The specific design and implementation of communication subsystems 1124 can depend on the communication network(s) over which the user device 1100 is intended to operate. For example, user device 1100 can include communication subsystems 1124 designed to operate over a GSM network, a GPRS network, an EDGE network, a WiFi or WiMax network, and a Bluetooth™ network. For example, wireless communication subsystems 1124 can include hosting protocols such that device 1100 can be configured as a base station for other wireless devices and or to provide a WiFi service.

Audio subsystem 1126 can be coupled to speaker 1128 and microphone 1130 to facilitate voice-enabled functions, such as speaker recognition, voice replication, digital recording, and telephony functions. Audio subsystem 1126 can be configured to facilitate processing voice commands, voice-printing, and voice authentication, for example.

I/O subsystem 1140 can include a touch-surface controller 1142 and or other input controller(s) 1144. Touch-surface controller 1142 can be coupled to a touch-surface 1146. Touch-surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 1146.

The other input controller(s) 1144 can be coupled to other input/control devices 1148, such as one or more buttons, rocker switches, thumb-wheel, infrared port, USB port, and or a pointer device such as a stylus. The one or more buttons (not shown) can include an up/down button for volume control of speaker 1128 and or microphone 1130.

In some implementations, a pressing of the button for a first duration can disengage a lock of touch-surface 1146; and a pressing of the button for a second duration that is longer than the first duration can turn power to user device 1100 on or off. Pressing the button for a third duration can activate a voice control, or voice command, module that enables the user to speak commands into microphone 1130 to cause the device to execute the spoken command. The user can customize a functionality of one or more of the buttons. Touch-surface 1146 can, for example, also be used to implement virtual or soft buttons and or a keyboard.

In some implementations, user device 1100 can present recorded audio and or video files, such as MP3, AAC, and MPEG files. In some implementations, user device 1100 can include the functionality of an MP3 player, such as an iPod™. User device 1100 can, therefore, include a 36-pin connector and or 8-pin connector that is compatible with the iPod. Other input/output and control devices can also be used.

Memory interface 1102 can be coupled to memory 1150. Memory 1150 can include high-speed random access memory and or non-volatile memory, such as one or more magnetic disk storage devices, one or more optical storage devices, and or flash memory (e.g., NAND, NOR). Memory 1150 can store an operating system 1152, such as Darwin, RTXC, LINUX, UNIX, OS X, Windows, or an embedded operating system such as VxWorks.

Operating system 1152 can include instructions for handling basic system services and for performing hardware dependent tasks. In some implementations, operating system 1152 can be a kernel (e.g., UNIX kernel). In some implementations, operating system 1152 can include instructions for performing voice authentication.

Memory 1150 can also store communication instructions 1154 to facilitate communicating with one or more additional devices, one or more computers and or one or more servers. Memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic messaging-related process and functions; web browsing instructions 1164 to facilitate web browsing-related processes and functions; media processing instructions 1166 to facilitate media processing-related functions and processes; GNSS/Navigation instructions 1168 to facilitate GNSS and navigation-related processes and instructions; and or camera instructions 1170 to facilitate camera-related processes and functions.

Memory 1150 can store application (or "app") instructions and data 1172, such as instructions for the apps described above in the context of FIGS. 1-9. Memory 1150 can also store other software instructions 1174 for various other software applications in place on device 1100.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method, performed within an extract, transform, load (ETL) pipeline and by at least one processor, comprising: receiving a quality check request from a user device; retrieving a structured query language (SQL) logic based on the quality check request by: extracting an SQL query from the distributed version control repository; and parsing the SQL query to identify one or more intermediate transformation steps; retrieving at least one data definition and mapping associated with the SQL logic; analyzing the SQL logic to identify contextual information and an ontology; generating an input prompt based on the SQL logic, the identified contextual information, and the ontology; submitting the input prompt to a large language model (LLM); analyzing, via the LLM, the input prompt to generate a data quality rule; and implementing the data quality rule within a distributed version control repository.

2. The computer-implemented method of claim 1 wherein receiving the quality check request comprises receiving a transformation pipeline definition.

3. The computer-implemented method of claim 1 wherein parsing the SQL query to identify the one or more intermediate transformation steps comprises parsing an existing codebase to extract source and target table names.

4. The computer-implemented method of claim 3 wherein analyzing the SQL logic comprises:
identifying a database table schema; and
identifying one or more manual validation queries.

5. The computer-implemented method of claim 3 wherein analyzing the SQL logic comprises:
mapping column usage in the source and target tables;
identifying a column lineage of target attributes to source attributes; and
identifying a derivation logic of target attributes to source attributes.

6. The computer-implemented method of claim 1 wherein generating the data quality rule comprises at least one of:
generating a rule in a format usable within the ETL pipeline; or
generating a rule in a custom framework.

7. The computer-implemented method of claim 1 comprising evaluating the data quality rule by at least one of:
verifying a syntax structure of the data quality rule;
retrieving sample data using a data sampler; or
executing a distributed data processing-based data validation test.

8. The computer-implemented method of claim 1 wherein generating the data quality rule comprises at least one of:
generating a uniqueness rule;
generating a referential integrity rule;
generating a value constraint rule;
generating a pattern rule; or
generating a completeness rule.

9. The computer-implemented method of claim 1 wherein analyzing the SQL logic to identify the ontology comprises identifying a knowledge graph defining an attribute relationship.

10. A computing system within an extract, transform, load (ETL) pipeline comprising:
a processor; and
a non-transitory computer-readable storage device storing computer-executable instructions, the instructions when executed by the processor cause the processor to perform operations comprising:
receiving a quality check request from a user device, the quality check request comprising a transformation pipeline definition;
retrieving a structured query language (SQL) logic based on the quality check request;
retrieving at least one data definition and mapping associated with the SQL logic;
analyzing the SQL logic to identify contextual information and an ontology;
generating an input prompt based on the SQL logic, the identified contextual information, and the ontology;

submitting the input prompt to a large language model (LLM);

analyzing, via the LLM, the input prompt to generate a data quality rule; and implementing the data quality rule within a distributed version control repository.

11. The computing system of claim 10 wherein retrieving the SQL logic comprises:

extracting an SQL query from the distributed version control repository; and parsing the SQL query to identify one or more intermediate transformation steps.

12. The computing system of claim 11 wherein parsing the SQL query to identify the one or more intermediate transformation steps comprises parsing an existing codebase to extract source and target table names.

13. The computing system of claim 12 wherein analyzing the SQL logic comprises:

identifying a database table schema; and identifying one or more manual validation queries.

14. The computing system of claim 12 wherein analyzing the SQL logic comprises:

mapping column usage in the source and target tables;

identifying a column lineage of target attributes to source attributes; and identifying a derivation logic of target attributes to source attributes.

15. The computing system of claim 10 wherein generating the data quality rule comprises at least one of:

generating a rule in a format usable within the ETL pipeline; or generating a rule in a custom framework.

16. The computing system of claim 10, wherein the operations comprise evaluating the data quality rule by at least one of:

verifying a syntax structure of the data quality rule;

retrieving sample data using a data sampler; or executing a distributed data processing-based data validation test.

17. The computing system of claim 10 wherein generating the data quality rule comprises at least one of:

generating a uniqueness rule;

generating a referential integrity rule;

generating a value constraint rule;

generating a pattern rule; or generating a completeness rule.

18. The computing system of claim 10 wherein analyzing the SQL logic to identify the ontology comprises identifying a knowledge graph defining an attribute relationship.

* * * * *